(12) United States Patent
Huang et al.

(10) Patent No.: US 7,480,120 B2
(45) Date of Patent: Jan. 20, 2009

(54) APPARATUS AND METHOD FOR DAMPING SLIDER-GIMBAL COUPLED VIBRATION OF A HARD DISK DRIVE

(75) Inventors: Fu-Ying Huang, San Jose, CA (US); Remmelt Pit, Cupertino, CA (US); Vedantham Raman, Morgan Hill, CA (US); Qinghua Zeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 356 days.

(21) Appl. No.: 11/104,356

(22) Filed: Apr. 12, 2005

(65) Prior Publication Data

US 2006/0227464 A1    Oct. 12, 2006

(51) Int. Cl.
G11B 5/48    (2006.01)
(52) U.S. Cl. .................................................. 360/245.3
(58) Field of Classification Search .............. 360/245.3, 360/245.8, 245.9
See application file for complete search history.

(56) References Cited

U.S. PATENT DOCUMENTS

| | | | |
|---|---|---|---|
| 4,389,688 A | 6/1983 | Higashiyama | |
| 4,905,111 A | 2/1990 | Tuma et al. | |
| 5,187,625 A | 2/1993 | Blaeser et al. | |
| 5,442,504 A | 8/1995 | Nagase et al. | |
| 5,463,513 A * | 10/1995 | Hoshino | 360/246.6 |
| 5,473,487 A * | 12/1995 | Nagase | 360/245.6 |
| 5,943,191 A | 8/1999 | Giere et al. | |
| 6,028,740 A * | 2/2000 | Konno et al. | 360/245.7 |
| 6,549,376 B1 | 4/2003 | Scura et al. | |
| 6,731,466 B2 | 5/2004 | Arya | |
| 6,751,062 B2 | 6/2004 | Kasajima et al. | |
| 6,771,467 B2 * | 8/2004 | Kasajima et al. | 360/234.6 |
| 6,775,102 B2 * | 8/2004 | Kasajima et al. | 360/234.6 |
| 6,801,398 B1 * | 10/2004 | Ohwe et al. | 360/234.6 |
| 6,967,821 B2 * | 11/2005 | Himes et al. | 360/245.3 |
| 7,046,483 B2 * | 5/2006 | Erpelding | 360/245.3 |
| 2002/0105759 A1 | 8/2002 | Iwakura | |
| 2003/0011936 A1 | 1/2003 | Himes et al. | |
| 2003/0206375 A1* | 11/2003 | Kanaya et al. | 360/241.2 |

FOREIGN PATENT DOCUMENTS

| | | | |
|---|---|---|---|
| JP | 62065263 | * | 3/1987 |
| JP | 63302483 | * | 12/1988 |
| JP | 02143945 | * | 6/1990 |
| JP | 02177169 | * | 7/1990 |

* cited by examiner

Primary Examiner—Angel A. Castro

(57) ABSTRACT

An apparatus and method for damping slider-gimbal coupled vibration of a hard disk drive is disclosed. The method provides a suspension for reaching over a disk. A slider having a read/write head element on a trailing edge (TE) portion is also provided, the slider coupled with the suspension at a gimbal structure. In addition, a damping zone is provided at a stress point on the gimbal structure, the damping zone having a damping material thereon, wherein the damping material reduces vibration of the slider and the gimbal structure.

19 Claims, 6 Drawing Sheets

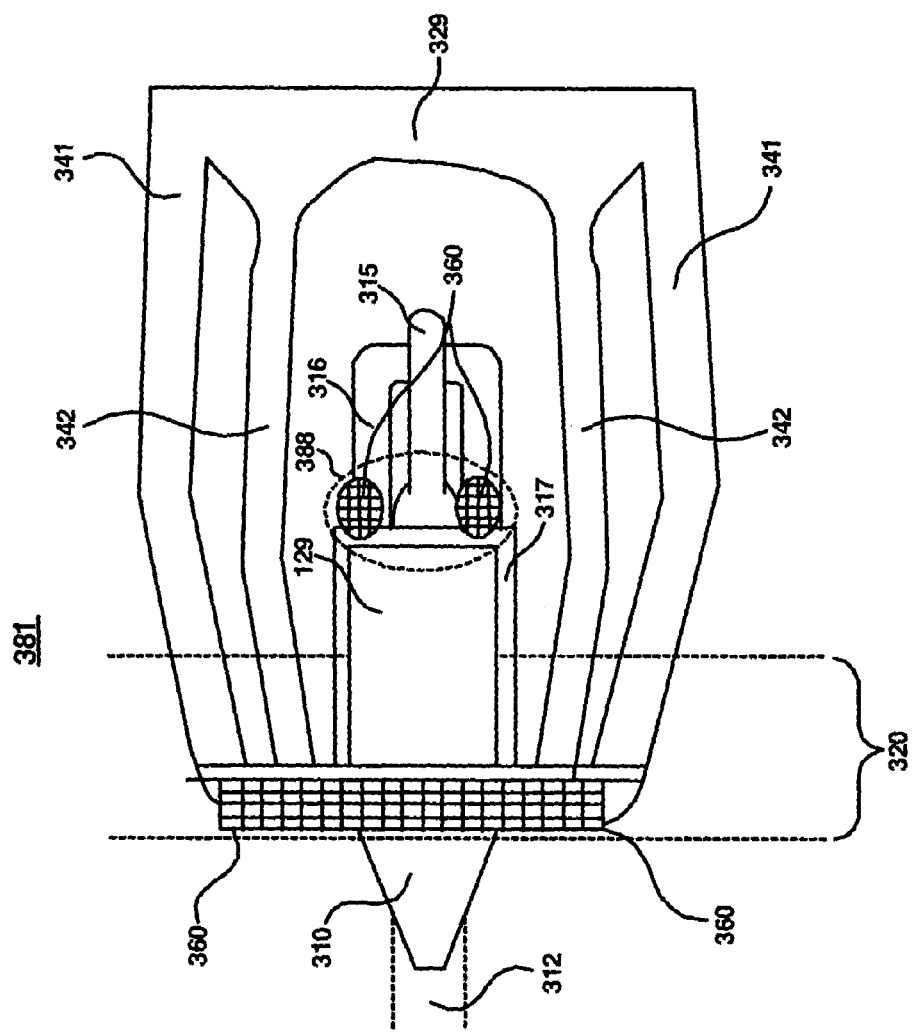

APPARATUS AND METHOD FOR DAMPING SLIDER-GIMBAL COUPLED VIBRATION OF A HARD DISK DRIVE

TECHNICAL FIELD

The present invention relates to the field of hard disk drive development, and more particularly to an apparatus and method for damping slider-gimbal coupled vibration of a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

However, the decreased track spacing and the overall reduction in HDD component size and weight have resulted in problems with respect to the HGA. Specifically, as the component sizes shrink, a need for tighter aerial density arises. In other words, the HGA is brought physically closer to the magnetic media. In some cases, the HGA will reach "ground zero" or contact recording. However, one of the major problems with contact recording or near contact recording is the effect of vibration on the head portion of the HGA when it encounters the magnetic media or disk. That is, when the slider contacts the disk, dynamic coupling between the slider and the gimbal structure could make the interface unstable and generate a strong or even a sustained slider vibration. The vibration will result in slider flying height modulation thereby degrading read/write performance. This problem is particularly egregious when the drive is a load/unload drive and the gimbal includes a nose limiter extending from the flexure tab under the slider providing an additional moment arm thereby increasing the vibration characteristics.

What is needed is a reliable and repetitive method for damping the vibration due to coupling between the slider and the gimbal structure after disk surface contact. This contact may be generated either during "normal" steady state operation of the hard drive due to the low fly heights or because of loading or unloading events in a load/unload drive, or a shock event during operational state.

SUMMARY

An apparatus and method for damping slider-gimbal coupled vibration of a hard disk drive is disclosed. The method provides a suspension for reaching over a disk. A slider having a read/write head element on a trailing edge (TE) portion is also provided, the slider coupled with the suspension at a gimbal structure. In addition, a damping zone is provided at a stress point on the gimbal structure, the damping zone having a damping material thereon, wherein the damping material reduces vibration of the slider and the gimbal structure.

BRIEF DESCRIPTION OF THE DRAWINGS

FIG. 3c is a bottom view of a third exemplary head gimbal assembly with a third damping zone in accordance with one embodiment of the present invention.

BEST MODES FOR CARRYING OUT THE INVENTION

Reference will now be made in detail to the alternative embodiment(s)s of the present invention, an apparatus and method for damping slider-gimbal coupled vibration of a hard disk drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of an electrical lead suspension (ELS) in conjunction with its operation within a hard disk drive and components connected therewith. The discussion will then focus on embodiments of a method for slider-gimbal coupled vibration of a hard disk drive in particular.

Figure 1:
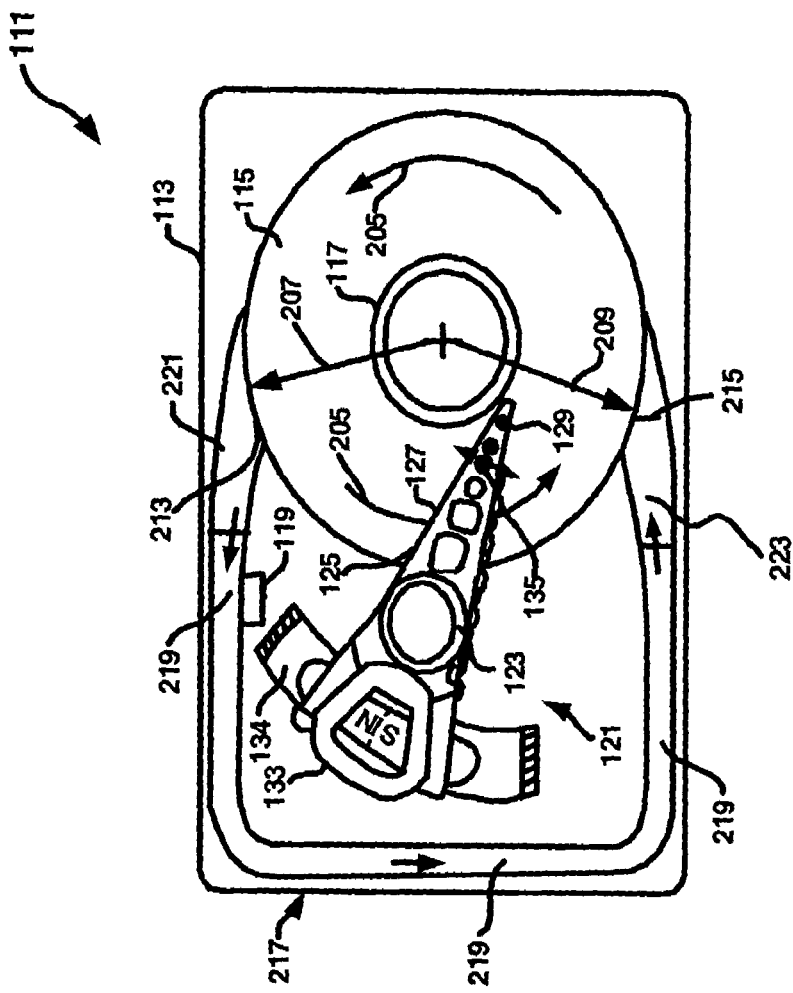
FIG. 1 is a schematic top plan view of a hard disk drive, in accordance with one embodiment of the present invention.

With reference now to FIG. 1, a schematic drawing of one embodiment of an information storage system comprising a magnetic hard disk file or drive 111 for a computer system is shown. Embodiments of the invention are well suited for utilization on a plurality of hard disk drives. The utilization of the driver of FIG. 1 is merely one of a plurality of disk drives which may be utilized in conjunction with the present invention. For example, in one embodiment the hard disk drive 111 would use load/unload (L/UL) techniques with a ramp. In anther embodiment, the drive is a non L/UL drive, wherein low fly heights can induce vibrations because of accidental head disk contacts, for example, in a CSS drive. In yet another embodiment, the slider-gimbal coupled vibration dampening is applied to HGA with a nose limiter. In yet another embodiment, the damping method/location may be applied to an HGA without a nose limiter.

In the exemplary FIG. 1, Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered (load beam removed) ELS 127. It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

In one embodiment, the drive 111 is a load/unload drive. In general, the load/unload drive refers to the operation of the ELS 127 with respect to the operation of the disk drive. That is, when the disk 115 is not rotating, the ELS 127 is unloaded from the disk. For example, when the disk drive is not in operation, the ELS 127 is not located above the disk 115 but is instead located in a holding location away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the overall non-operational robustness of the HDD 111 is greatly increased.

Figure 2:
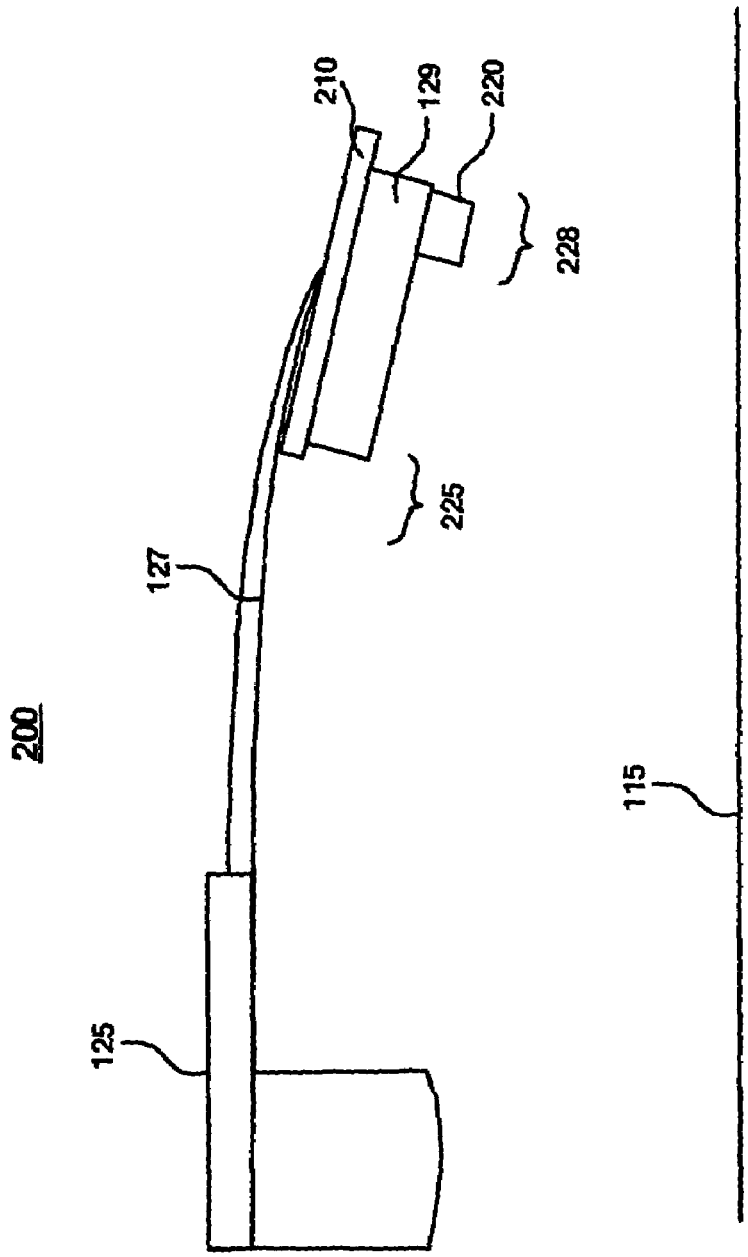
FIG. 2 is a side view of an exemplary actuator according to one embodiment of the present invention.

Referring now to FIG. 2, a side view of an exemplary actuator 200 is shown in accordance with one embodiment of the present invention. In one embodiment, as described herein, the actuator arm 125 has extending from it at least one cantilevered (load beam removed) ELS 127. A magnetic read/write transducer or head 220 is mounted on a slider 129 and secured via a gimbal 210 that is coupled to each ELS 127. The level of integration called the head gimbal assembly (HGA) is the head 220 and the slider 129, which are mounted on suspension 127 through the gimbal 210. The slider 129 has a leading edge (LE) portion 225 and a trailing edge portion (TE) 228, with the head 220 at the TE portion 228 of the slider 129. A portion of an exemplary disk 115 is also shown in FIG. 2 for purposes of clarity.

Figure 3A:
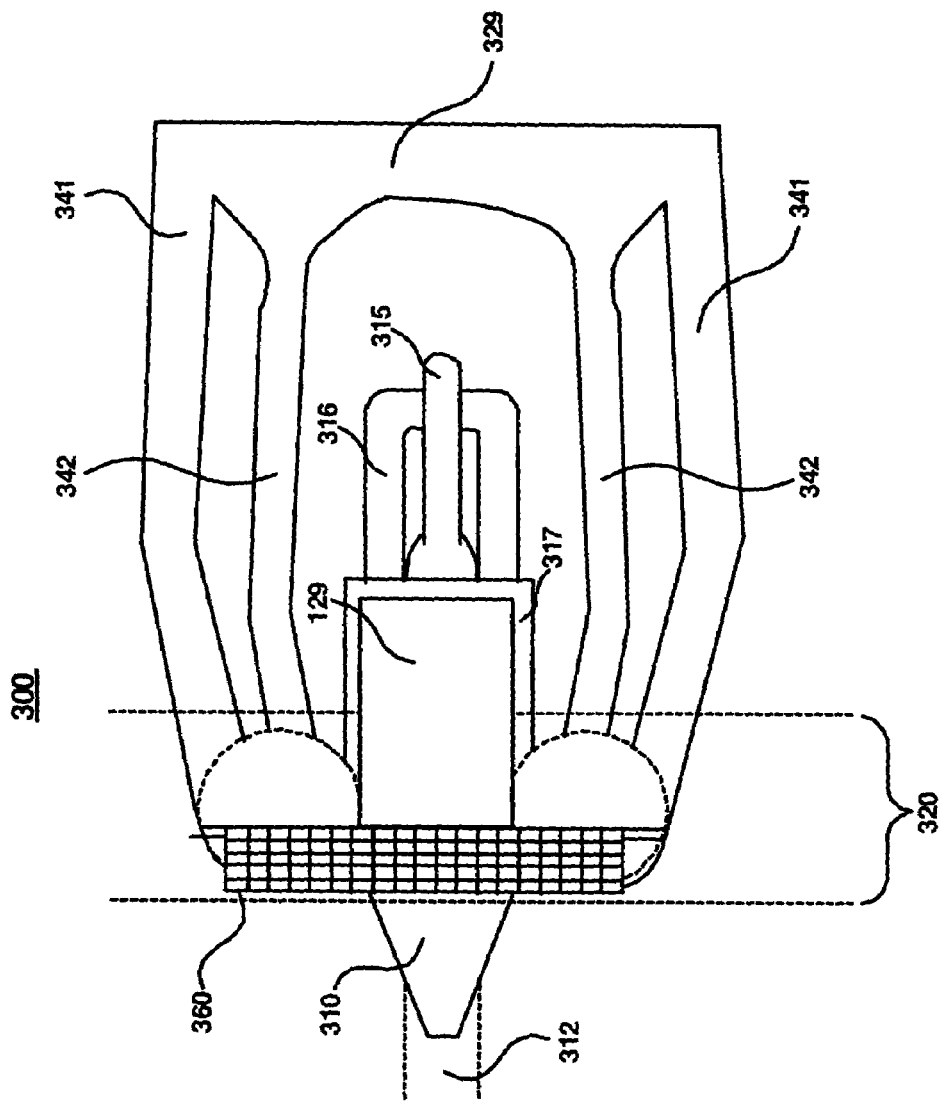
FIG. 3a is a bottom view of one exemplary head gimbal assembly with a first damping zone in accordance with one embodiment of the present invention.

With reference now to FIG. 3a, a bottom view of an exemplary head gimbal assembly (HGA) 300 is shown in accordance with one embodiment of the present invention. In one embodiment, HGA 300 includes a slider portion 129 and gimbal structure (e.g., flexure) 329. In one embodiment, gimbal structure 329 includes a flexure tongue 317, a front limiter 316, two flexible legs 342, electric connections 341 and a nose limiter 310. As is known in the art, gimbal structure 329 is utilized to flexibly suspend the head supporting slider 129 from the load beam 312. In general, the flexibility of the gimbal structure allows the slider 129 to remain flexible while flying above the disk 115. In so doing, the slider 129 will maintain a correct attitude over the disk 115 allowing the head 220 (of FIG. 2) to remain in correct alignment with the disk 115 such that the read/write capabilities of the head 220 remain constant.

HGA 300 also includes a nose limiter 310 utilized during unload times of the disk drive. That is, when the ELS 127 is moved to a secure off-disk location during non-operation, the nose limiter 310 is utilized in conjunction with a staging platform to reduce unwanted motion of the gimbal structure 329. For example, on a HDD having a plurality of ELS 127, and therefore a plurality of HGA 300, during the unload state there is a need to support the gimbal structure 329 such that the sliders will not contact each other during movement of the HDD, or when the HDD experiences a shock event. By utilizing a staging platform having intimate contact with the nose limiter 310, and a front limiter 316 contact with the limiter bar 315 on the loadbeam 312, the deleterious movement of the gimbal structure 329 during unload times is greatly reduced. The front limiter 315, the nose limiter 310 and its associated staging platform are well known in the art.

With reference still to FIG. 3a, in one embodiment, during normal operation of the HDD, contact between the slider 129 and the disk 115 sometimes occurs. As stated herein, one of the major problems with the contact is the effect of vibration on the head portion of the HGA 300 when it encounters the magnetic media or disk 115. That is, when the slider 129 contacts the disk 115, dynamic coupling between the slider 129 and the gimbal structure 329 could make the interface unstable as well as generating a strong or even a sustained vibration. The vibration will result in slider 129 flying height modulation thereby degrading read/write performance, or resulting in the slider/disk interface failure. It also limits us from achieving a lower flying height that is required for a higher recording density.

This problem is particularly egregious when the drive is a load/unload drive. For example, when the HGA 300 includes a nose limiter 310 extending from the gimbal 329 providing an additional moment arm to the HGA 300 thereby increasing the vibration characteristics between the slider 129 and the gimbal structure 329. In other words, when the HGA 300 begins to vibrate the nose limiter 310 provides an additional mass and moment arm to help maintain the vibration (e.g., reaching a harmonic state) of the gimbal structure 329. The vibration was dominated by the nose limiter, and it has a very small capacity for damping, generally. A very small energy can keep the vibration sustained for a prolonged length of time such that the read/write capabilities and the interface reliability are significantly impacted.

Referring still to FIG. 3a, in one embodiment, a damping material 360 is placed in the damping zone 320 of the HGA 300 to dampen the offending vibrations. That is, in one embodiment, the damping material 360 reduces the vibrations associated with a disk-slider encounter after the encounter occurs. In another embodiment, the damping material 360 reduces the vibrations associated with a disk-slider encounter during the encounter.

In general, the damping material 360 is located within the damping zone 320 at the high strain point between the nose limiter 310 and the flexure legs, not at the point of greatest displacement. In one embodiment, the damping material 360 is a portion of the cover layer. In another embodiment, the damping material 360 is an epoxy, or glue, or similar type material having damping qualities. In yet another embodiment, the damping material 360 can be a constraint layer damper that can be a portion of trace layers. That is, in one embodiment, the constraint layer damper is composed of trace material (e.g., stainless steel as gimbal material, polymer as damper, and copper as top constraining layer), or an additional damping layer plus a constraining layer such as an additional stiff layer on top of gimbal sheet metal sandwiching a damping layer in between.

At the zone 320, typical designs have three main materials: stainless steel as a support structure, polymer as an electric isolation layer, and copper traces as electric connections. On the surface of the copper traces, there might be a golden coating layer. Any additional material at this zone can provide more or less damping effect. In other words, it will act as a damping material. Moreover, the polymer layer may utilize a high damping material, and therefore function as both a damping layer and an electric isolation layer.

Figure 3B:
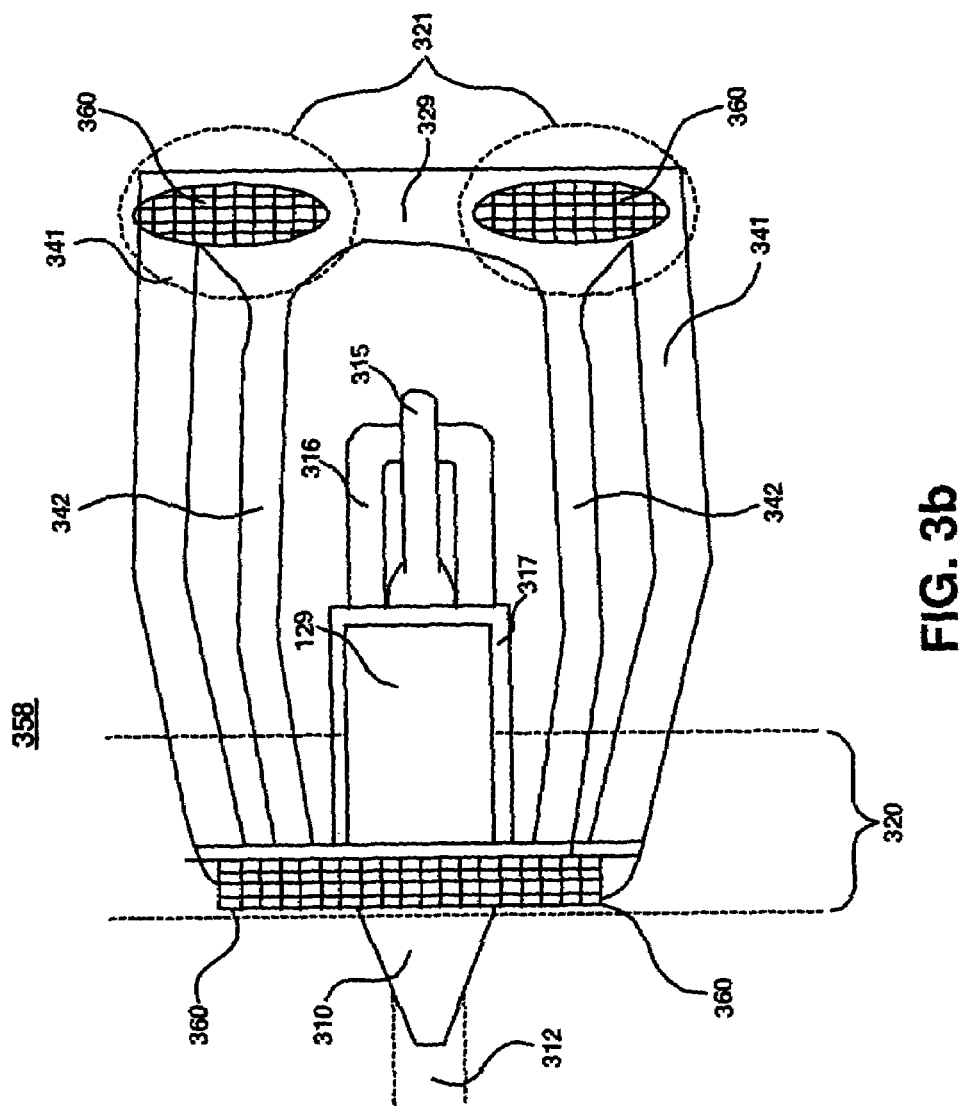
FIG. 3b is a bottom view of a second exemplary head gimbal assembly with a second damping zone in accordance with one embodiment of the present invention.

Referring to FIG. 3b, in one embodiment, a damping material 360 is placed in the damping zone 321 of the HGA 358 to dampen the offending vibrations that occur on the traces 341 and legs 342. The vibrations could be excited from the slider/disk contact, airflow, seeking, or other sources or events.

Referring to FIG. 3c, in one embodiment, a damping material 360 is placed in the damping zone 388 of the HGA 381 to dampen the offending vibrations that occur on the front limiter 316 and the flexure tongue 317. The vibrations could be excited from the slider/disk contact, airflow, seeking, or other sources or events. In another embodiment, the damping material placements will include any or all of the three separate damping material placement locations. That is, embodiments are well suited to a combination (or portions of each in a combination, or portions) of placements as shown in the three exemplary embodiments of FIGS. 3a, 3b and 3c.

Figure 4:
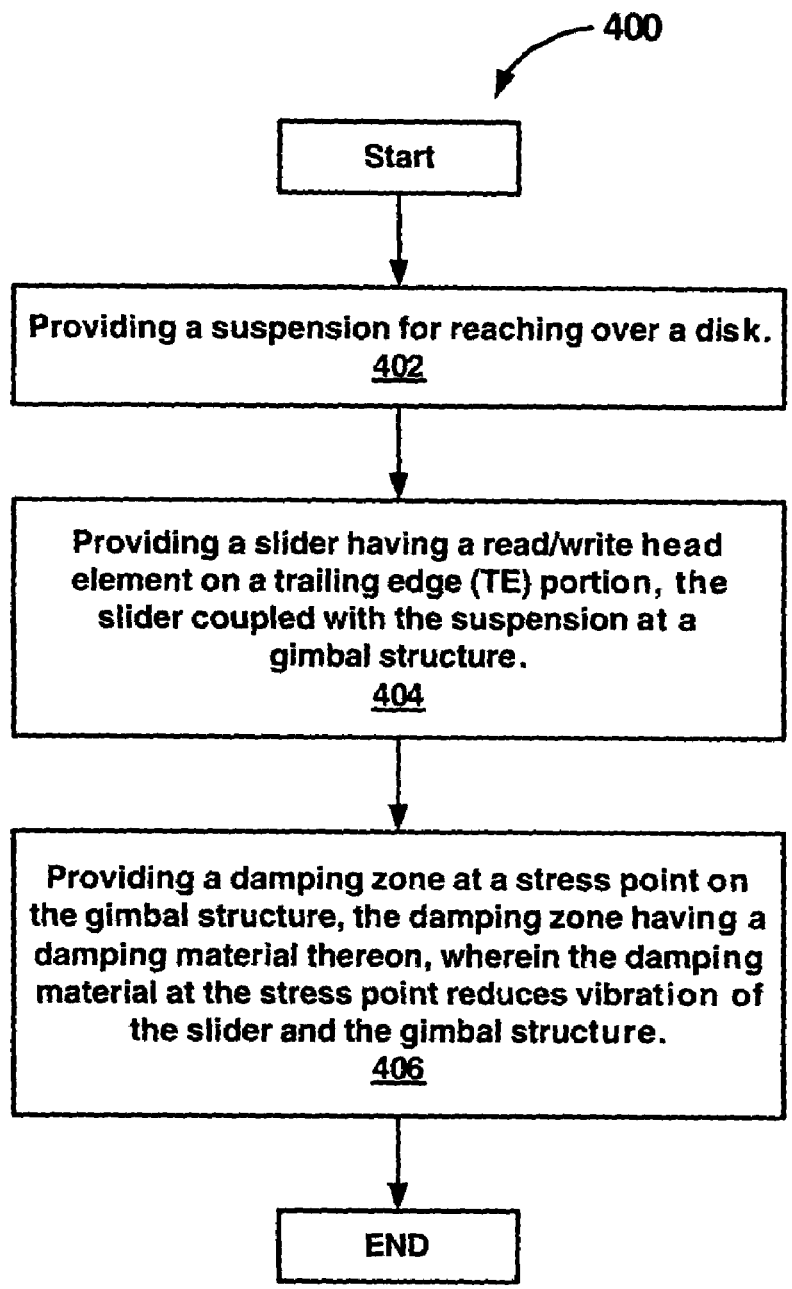
FIG. 4 is a flowchart of a method for damping gimbal coupled vibration of a hard disk drive in accordance with one embodiment of the present invention.

Referring now to FIG. 4, a flowchart 400 of a method for damping vibration between a slider and gimbal structure of a hard disk drive is shown in accordance with one embodiment of the present invention. In one embodiment, the hard disk drive is a contact drive, e.g., the head 220 is in contact with the disk 115. In another embodiment, the hard disk drive is a load/unload drive. In yet another embodiment, the hard disk drive is a standard device utilizing a HGA.

With reference now to step 402 of FIG. 4 and to FIG. 2, one embodiment provides a suspension 127 for reaching over a disk 115. As described in detail herein, the suspension (e.g., ELS) 127 has a spring-like quality, which biases or presses the air-bearing surface of the slider 129 against the disk 115 to cause the slider 129 to fly at a precise distance from the disk.

With reference now to step 404 of FIG. 4 and to FIG. 2, one embodiment provides a slider having a read/write head element 220 on a trailing edge (TE) portion 228, the slider 129 coupled with the suspension 329. In one embodiment, the head 220 is a portion of a contact recording system. That is, the head 220 is brought to "ground zero" or into contact with the disk it is over flying. In another embodiment, the head 220 has a tight aerial density and is not in contact with the disk 115 it is over flying, but is hovering just above the disk 115. In other words, although the head 220 is not designed to be in contact with the disk 115, due to the closeness with which it is flying with respect to the disk 115, intermittent contact may occur.

With reference now to step 406 of FIG. 4 and to FIG. 3, one embodiment provides a damping zone 320 at a stress point on the gimbal structure 329, the damping zone 320 having a damping material 360 thereon. In one embodiment, the damping material 360 at the stress point on the gimbal structure 329 reduces coupled vibration of the slider 129 and the gimbal structure 329. In one embodiment, the stress is a high stress. In another embodiment, the stress is a standard or even a low stress.

In one embodiment, the damping zone 320 is located aft of where the nose limiter 310 couples with the gimbal structure 329. In another embodiment, the damping zone 320 is located on the outboard sides of the nose limiter 310 where the nose limiter 310 couples with the gimbal structure 329. In yet another embodiment, the damping zone 320 is located at the point of stress of the coupled vibration mode between the slider 129 and the gimbal structure 329.

As stated herein, in one embodiment, the damping material 360 is a portion of the cover layer that was not removed during the subtractive manufacturing process. In another embodiment, the damping material 360 is a portion of the cover layer that was added during the additive manufacturing process. Therefore, the manufacturing of the HGA 300 including the damping material 360 in the damping zone 320 requires no additional materials or steps. In other words, the damping material 360 (e.g., cover layer) would simply be added to (or masked during the removal process) the damping zone 320 at the location of stress.

In another embodiment, the damping material is an elastic material having damping properties (e.g., epoxy, glue, tape, or the like) which is added as an additional step during the manufacturing process or after the manufacturing process. Furthermore, although damping material 360 is shown in one location in FIG. 3, the damping material 360 may be located anywhere within the damping zone 320. For example, in one embodiment, the damping material 360 is located at the nose limiter 310- gimbal structure 329 intersection. In another embodiment, the damping material 360 is located where the slider 129 couples with the gimbal structure 329. For example, the damping material 360 is either in addition to the epoxy layer utilized to bond the slider to the gimbal, or is utilized instead of the epoxy layer utilized to bond the slider to the gimbal.

In yet another embodiment, the damping material 360 is located at both the nose limiter 310—gimbal structure 329 intersection and where the slider 129 couples with the gimbal structure 329. In yet another embodiment, the damping material 360 is located on the flexible arms 340. In another embodiment as shown in FIG. 3c, the damping material 360 is located at the region between the front limiter 316 and the flexure tongue 317 to dampen the front limiter vibration. In yet another embodiment, the damping material 360 is located at another ends 321 of the traces 341 and legs 342. Therefore, although in one embodiment, the damping material 360 is shown at the shoulders of the gimbal structure 329, the illustration of only a few of the plurality of possible locations (e.g., FIGS. 3a through 3c) are for purposes of clarity and brevity.

By providing the damping material 360 within the damping zone 320, a plurality of benefits are achieved. Specifically, a reduction in the vibration characteristics of the HGA 300 is achieved. Moreover, the amplitude of the frequency response function, e.g., the slider vertical vibration at trailing edge center to the contact force at the same location, is greatly reduced. For example, without a dampening material 360, the HGA 300 shows strong responses with respect to a slider-disk contact. These responses are strongest at 48 kHz, 150 kHz and 180 kHz in one exemplary embodiment.

However, with the addition of the dampening material 360, the HGA 300 responses across the frequency spectrum are greatly reduced. That is, the dampening material 360 allows the HGA 300 to recover from a slider-disk contact and the following induced vibrations at a significantly faster rate. Therefore, instead of the vibrations becoming sustained, the dampening material 360 allows the vibration to be removed from the HGA 300 bringing the HGA 300 to within operational limitations. Therefore, the dampening material is an effective way to improve head-disk interface dynamics.

Thus, embodiments of the present invention provide, a method and system for damping the coupled vibration of a slider and gimbal structure of a hard disk drive. Additionally, embodiments provide a method and system for damping the vibration of a slider and gimbal structure of a hard disk drive which can reduce the vibrations resulting from when the slider contacts the disk portion during a disk-slider encounter. Moreover, embodiments provide a method for damping vibration between a slider and gimbal structure of a hard disk drive which is compatible with present manufacturing techniques resulting in little or no additional costs.

While the method of the embodiment illustrated in flow chart 400 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for damping the coupled vibration of a slider and gimbal structure of a hard disk drive is thus described. While the present invention has been described in particular embodiments, it should be appreciated that the present invention should not be construed as limited by such embodiments, but rather construed according to the below claims.

What is claimed is:

1. A method for damping slider-gimbal coupled vibration of a hard disk drive comprising:
   providing a suspension for reaching over a disk;
   providing a slider having a read/write head element on a trailing edge (TE) portion, said slider coupled with said suspension at a gimbal structure; and
   providing a damping zone at a stress point on the gimbal structure, said damping zone located on the outboard sides of a nose limiter where said nose limiter couples with said gimbal structure, said damping zone having a damping material thereon, wherein the damping material at the stress point reduces vibration of said slider and the gimbal structure.

2. The method of claim 1 wherein said hard disk drive is a contact drive.

3. The method of claim 1 wherein said hard disk drive is a load/unload drive.

4. The method of claim 1 wherein said damping material is a portion of a cover layer.

5. The method of claim 1 wherein said damping material is an elastic material added to said damping zone.

6. The method of claim 1 wherein said damping material is a constraint layer damper added to said damping zone.

7. A slider having a damping zone for damping slider-gimbal coupled vibration of a hard disk drive comprising:
   a suspension for reaching over a disk;
   a slider having a read/write head element on a trailing edge (TE) portion, said slider coupled with said suspension at a gimbal structure; and
   a damping zone at a stress point on the gimbal structure, said damping zone located on the outboard sides of a nose limiter where said nose limiter couples with said gimbal structure, wherein a damping material at the stress point reduces vibration of said slider and the gimbal structure.

8. The slider of claim 7 wherein said hard disk drive is a contact drive.

9. The slider of claim 7 wherein said hard disk drive is a load/unload drive.

10. The slider of claim 7 wherein said damping material is a portion of a cover layer.

11. The slider of claim 7 wherein said damping material is an elastic material added to said damping zone.

12. The slider of claim 7 wherein said damping material is a constraint layer damper added to said damping zone.

13. A hard disk drive comprising:
   a housing;
   a disk pack mounted to the housing and having a plurality of disks that are rotatable relative to the housing, the disk pack defining an axis of rotation and a radial direction relative to the axis;
   an actuator mounted to the housing and being movable relative to the disk pack, the actuator having a suspension for reaching over the disk, the suspension having a slider coupled therewith, said slider having a damping zone for damping vibration between said slider and a gimbal structure of a hard disk drive comprising:
      a suspension for reaching over a disk;
      a slider having a read/write head element on a trailing edge (TE) portion, said slider coupled with said suspension at a gimbal structure; and
      a damping zone at a point of stress between said slider and said gimbal structure, said damping zone located on the outboard sides of a nose limiter where said nose limiter couples with said gimbal structure, said damping zone having a damping material thereon, wherein the damping material at said point of stress between said slider and said gimbal structure reduces vibration of said slider and the gimbal structure.

14. The hard disk drive of claim 13 wherein said hard disk drive is a contact drive.

15. The hard disk drive of claim 13 wherein said hard disk drive is a load/unload drive.

16. The hard disk drive of claim 13 wherein said damping material is a portion of a cover layer.

17. The hard disk drive of claim 13 wherein said damping material is an elastic material added to said damping zone.

18. The hard disk drive of claim 13 wherein said damping material is a constraint layer damper added to said damping zone.

19. A slider having a damping zone for damping vibration between said slider and a gimbal structure of a hard disk drive comprising:

a means for providing a suspension for reaching over a disk;

a means for providing a slider having a read/write head element on a trailing edge (TE) portion, said slider coupled with said suspension at a gimbal structure; and a means for providing a damping zone at a point of stress between said slider and said gimbal structure, said damping zone located on the outboard sides of a nose limiter where said nose limiter couples with said gimbal structure, said damping zone having a damping material thereon, wherein the damping material at said point of stress between said slider and said gimbal structure reduces vibration of said slider and the gimbal structure.

* * * * *